US009122863B2

(12) United States Patent
Huang et al.

(10) Patent No.: US 9,122,863 B2
(45) Date of Patent: Sep. 1, 2015

(54) CONFIGURING IDENTITY FEDERATION CONFIGURATION

(71) Applicant: International Business Machines Corporation, Armonk, NY (US)

(72) Inventors: He Yuan Huang, Beijing (CN); Liu Jian, Beijing (CN); Min Li, Beijing (CN); Xiao Xi Liu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 219 days.

(21) Appl. No.: 13/719,305

(22) Filed: Dec. 19, 2012

(65) Prior Publication Data
US 2013/0160105 A1 Jun. 20, 2013

(30) Foreign Application Priority Data

Dec. 19, 2011 (CN) .......................... 2011 1 0426561

(51) Int. Cl.
*G06F 21/41* (2013.01)
*G06F 21/60* (2013.01)
*H04L 29/06* (2006.01)

(52) U.S. Cl.
CPC .............. *G06F 21/41* (2013.01); *G06F 21/604* (2013.01); *H04L 63/0815* (2013.10); *H04L 63/10* (2013.01)

(58) Field of Classification Search
CPC ... G06F 21/604; G06F 21/41; H04L 63/0815; H04L 63/10
USPC .............................................. 726/8
See application file for complete search history.

(56) References Cited

U.S. PATENT DOCUMENTS

| 7,552,468 | B2 | 6/2009 | Burch et al. | |
| 7,747,647 | B2* | 6/2010 | Canning et al. | 707/785 |
| 2003/0154401 | A1* | 8/2003 | Hartman et al. | 713/201 |
| 2006/0136990 | A1* | 6/2006 | Hinton et al. | 726/2 |
| 2007/0153814 | A1* | 7/2007 | Canning et al. | 370/401 |
| 2009/0089625 | A1 | 4/2009 | Kannappan et al. | |
| 2009/0307744 | A1* | 12/2009 | Nanda et al. | 726/1 |
| 2011/0153727 | A1 | 6/2011 | Li | |
| 2011/0231918 | A1* | 9/2011 | Shah et al. | 726/8 |
| 2014/0165150 | A1* | 6/2014 | Brunswig et al. | 726/4 |

OTHER PUBLICATIONS

Huang et al., Identity Federation Broker for Service Cloud, Service Sciences (ICSS), pp. 115-120 (IEEE May 14, 2010).*

* cited by examiner

*Primary Examiner* — Theodore Parsons
(74) *Attorney, Agent, or Firm* — Tutunjian & Bitetto, P.C.; Jeff Tang

(57) ABSTRACT

A method and apparatus for configuring identity federation configuration. The method includes: acquiring a set of identity federation configuration properties of a first computing system and a set of identity federation configuration properties of a second computing system; identifying one or more pairs of associated properties in the first and the second sets, where the pairs of associated properties include one property from each set of identity federation configuration; displaying, properties that need to be configured manually from the each sets of identity federation configuration properties, where the properties that need to be configured manually do not include the property in any pair of associated properties for which the value can be derived from the value of another property in the pair; automatically assigning a property that can be derived from the value of another property; and providing each computing systems with each set of identity federation properties.

20 Claims, 7 Drawing Sheets

CONFIGURING IDENTITY FEDERATION CONFIGURATION

CROSS-REFERENCE TO RELATED APPLICATION

This application claims priority under 35 U.S.C. §119 from Chinese Patent Application No. 201110426561.4 filed Dec. 19, 2011, the entire contents of which are incorporated herein by reference.

BACKGROUND OF THE INVENTION

1. Field of the Invention

This invention relates to identity federation configuration across computer systems.

2. Description of the Related Art

Identity federation is used for managing the identity and as well as resource-access authorization across computing systems. A typical example of access to cross-computing system resources is the application of cloud services. With the popularity of cloud services, more and more customers, such as enterprises, leverage cloud services to satisfy their business needs. Identity federation enables users to seamlessly access cross-domain applications, which provides a way for enterprises to access a variety of applications of cloud services using internal accounts of the enterprises. The work of configuring the identity federation at both sides of the enterprise and the cloud service is done by system administrator from the enterprise itself (or so-called "client administrator"). As providers of cloud services usually provide their cloud services in proprietary environments using proprietary data formats even in proprietary protocols, in other words, the enterprise and the cloud service provider may adopt different identity federation standards, and the style of user interface and the data format at the enterprise side may completely different from the cloud service side. Thus, the system administrator has to be familiar with not only the identity federation configuration standards and the user interface at the enterprise side, but also the identity federation configuration standards and the user interface at the cloud service side. Moreover, there are often a lot of repetitive data existing in the identity federation configuration of both sides, leading to unnecessary workload for the system administrator.

SUMMARY OF THE INVENTION

One of the objectives of the present invention is to set identity federation configurations for two computing systems with established trust relationship in a central and consistent manner, during the period of identity federation configuration setting, and reduce the amount of identity federation parameters that need to be set by the system administrator while ensuring the consistency of the identity federation configurations of the two computing systems.

In one aspect, a method for configuring identity federation configuration is provided, which includes: acquiring a first set of identity federation configuration properties of a first computing system and a second set of identity federation configuration properties of a second computing system; identifying one or more pairs of associated properties in the first and the second sets of identity federation configuration properties, where each of the pairs of associated properties includes one property from the first set of identity federation configuration properties and one property from the second set of identity federation configuration properties; displaying, in a unified user interface, properties that need to be configured manually from the first and the second sets of identity federation configuration properties, where the properties that need to be configured manually do not include the property in any pair of associated properties for which the value can be derived from the value of another property in the pair; automatically assigning a value to an property for which the value can be derived from the value of another property; and providing the first and the second computing systems respectively with the first set of identity federation properties and the second set of identity federation properties that have been configured.

In another aspect of the present invention, provides an apparatus for configuring an identity federation configuration, including: an acquisition module, configured to acquire a first set of identity federation configuration properties of a first computing system and a second set of identity federation configuration properties of a second computing system; an association module, configured to identify one or more pairs of associated properties in the first and the second sets of identity federation configuration properties, where each of the pairs of associated properties includes one property from the first set of identity federation configuration properties and one property from the second set of identity federation configuration properties; a user interaction module, configured to display, in a unified user interface, properties that need to be configured manually from the first and the second sets of identity federation configuration properties, where the properties that need to be configured manually do not include the property in any pair of associated properties for which the value can be derived from the value of another property in the pair; a cross-assignment module, configured to automatically assigning a value to an property for which the value can be derived from the value of another property; and a configuration adapter, configured to provide the first and the second computing systems respectively with the first set of identity federation properties and the second set of identity federation properties that have been configured.

BRIEF DESCRIPTION OF THE DRAWINGS

Features, advantages, and other aspects of various embodiments of the present invention will become more apparent from the following detailed description, when taken in conjunction with the figures illustrate several embodiments of the present invention in an exemplary rather than limiting manner.

DETAILED DESCRIPTION OF THE PREFERRED EMBODIMENT

Figure 1A:
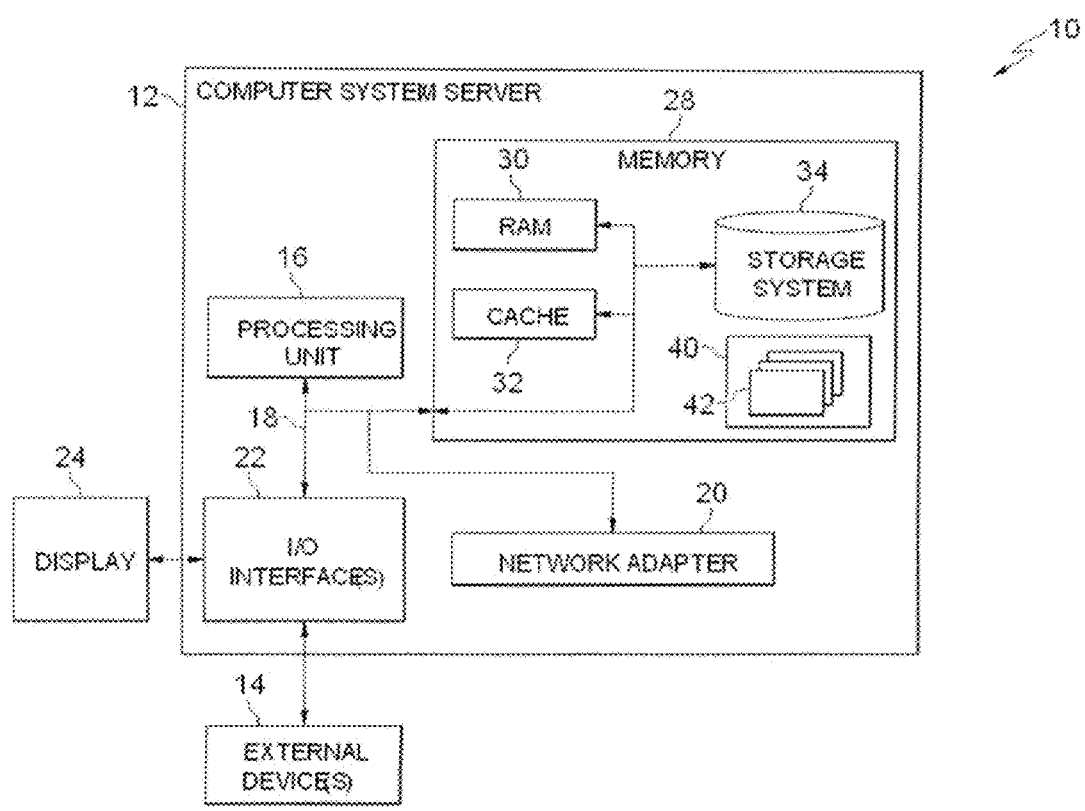
FIG. 1A is a schematic diagram showing a functional block diagram of a cloud computing node in an embodiment of the present invention.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

It is understood in advance that although this invention includes a detailed description on cloud computing, implementation of the teachings are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including; network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including; networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over the operating system, storage, deployed applications, and possibly limited control of select networking components (e.g., host firewalls).

Deployment Models are as follows:

Private cloud: the cloud infrastructure is operated solely for an organization. It can be managed by the organization or a third party and may exist on-premises or off-premises.

Community cloud: the cloud infrastructure is shared by several organizations and supports a specific community that has shared concerns (e.g., mission, security requirements, policy, and compliance considerations). It can be managed by the organizations or a third party and may stored on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, a schematic diagram showing an example of a cloud computing node. Cloud computing node 10 is only one example of a suitable cloud computing node and is not intended to suggest any limitation as to the scope of use or functionality of embodiments of the present invention. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1A, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of one aspect of the present invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
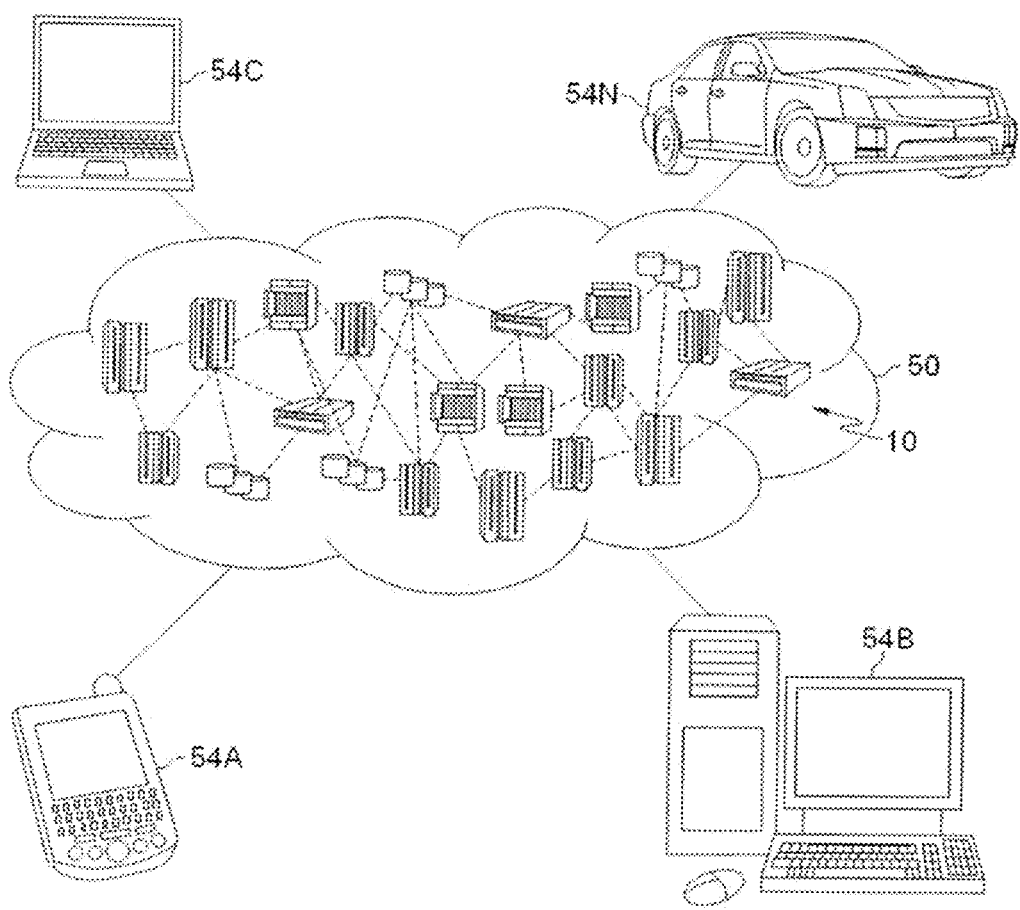
FIG. 1B is a functional block diagram showing a cloud computing environment in an embodiment of the present invention.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
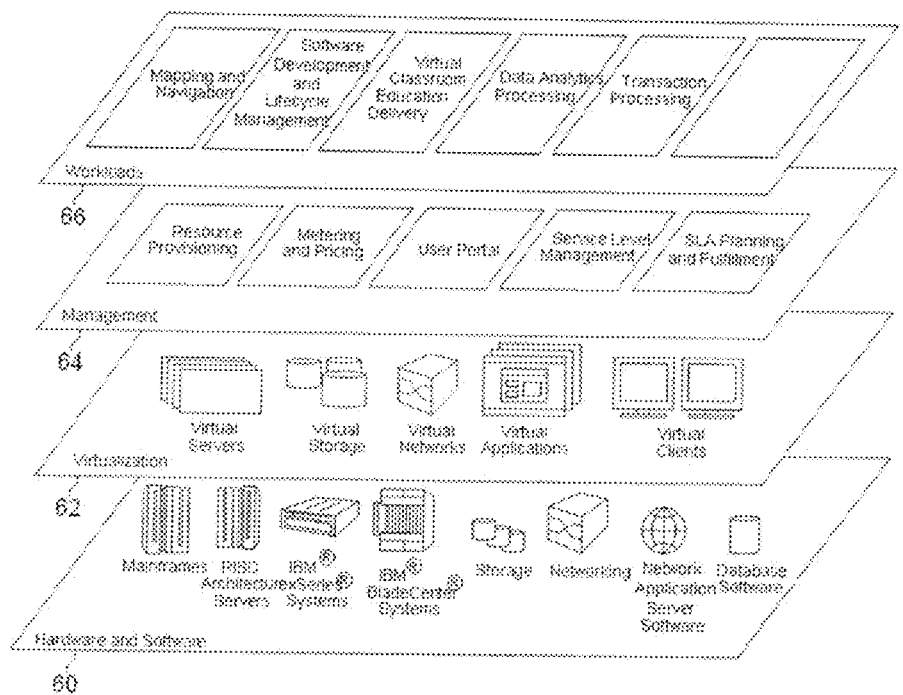
FIG. 1C is an abstraction model showing layers according to an embodiment of the present invention.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include mainframes, in for example IBM® zSeries® systems; RISC (Reduced Instruction Set Computer) architecture based servers, IBM pSeries® systems; IBM xSeries® systems; IBM BladeCenter® systems; storage devices; networks and networking components. Examples of software components include network application server software, IBM WebSphere® application server software; and database software, and IBM DB2® database software.

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing for example.

Figure 2A:
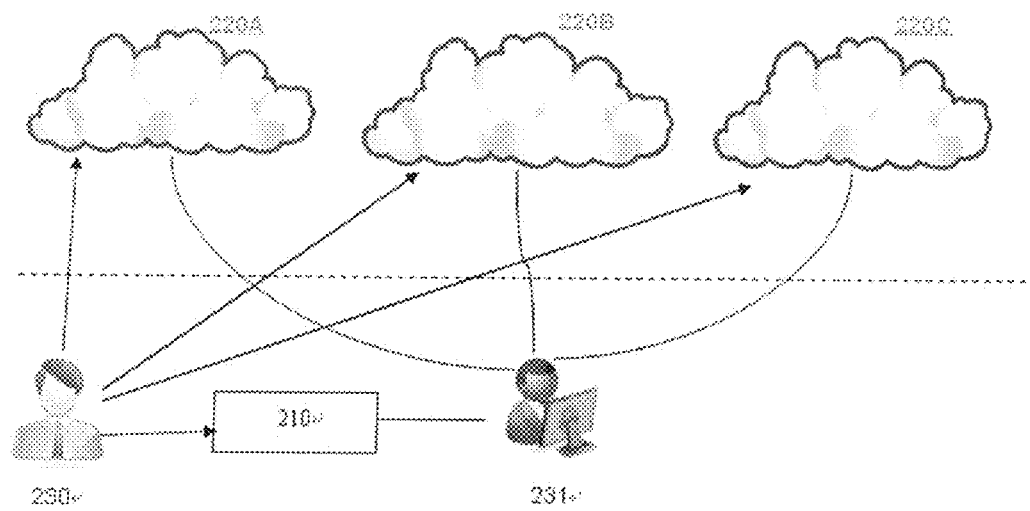
FIG. 2A is an abstraction model illustrating the manner of the prior art in which identity federation configurations are set for different computing systems.
Figure 2B:
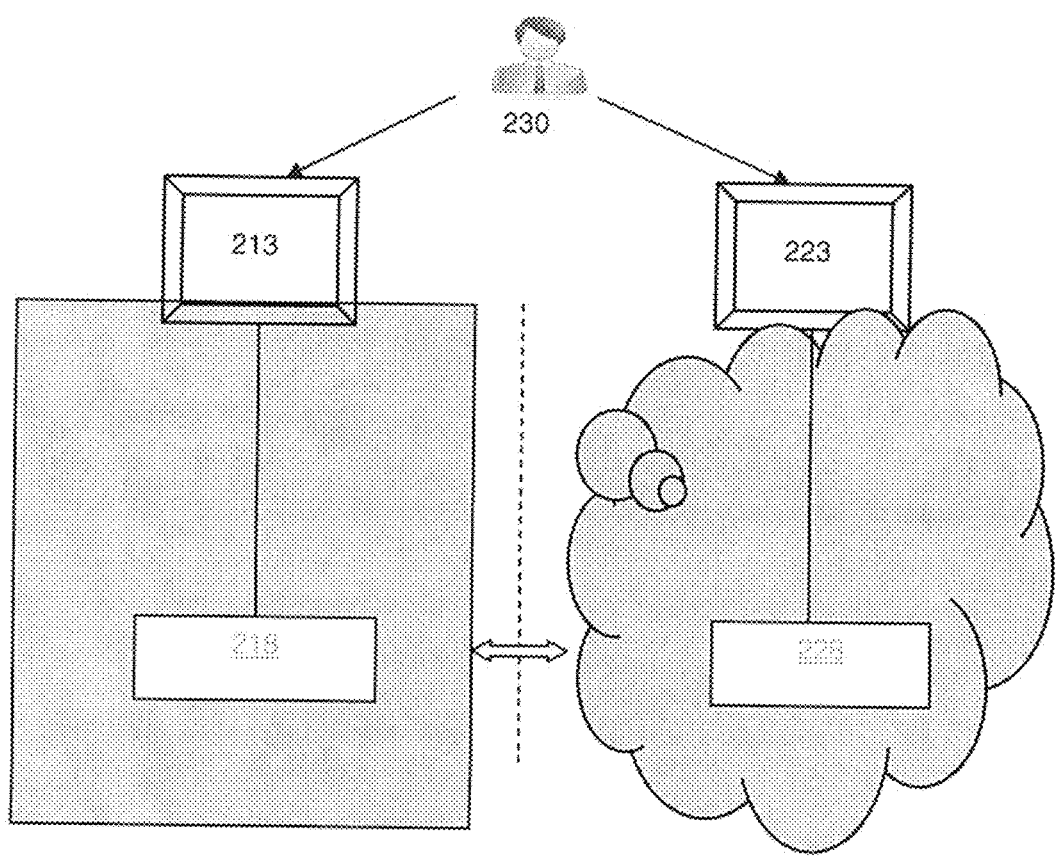
FIG. 2B is an abstraction model illustrating another manner of the prior art in which identity federation configurations are set for different computing systems.

FIGS. 2A and 2B illustrate the manner of the prior art in which identity federation configurations are set for different computing systems.

FIG. 2A shows a computing system 210 and computing systems 220A, 220B and 220C. Computing system 210 can be connected to computing systems 220A, 220B, or 220C via a computer network to acquire the resources or services provided by computing systems 220A, 220B, or 220C. For example, computing system 210 is the one of an enterprise, such as a server hosting/running internal applications of the enterprise. Computing systems 220A, 220B, and 220C are cloud services (hereinafter also referred to as "cloud") provided by different service providers A, B and C, respectively. User 231 of the enterprise can access, through his desktop system, the resources of the internal application on system 210 of the enterprise and the resources of cloud services 220A, 220B, and 220C simultaneously. The federated identity allows the user, upon being authenticated with an identity, to access other resources with other identities without requiring the user to re-login for authentication. To facilitate user 231 to access different clouds 220A, 220B, or 220C, a system administrator 230 needs to set the identity federation (hereinafter also referred to as the "federation") at both sides of computing system 210 and cloud 220A, the federation at both sides of computing system 210 and cloud 220B and the federation at both sides of computing system 210 and cloud 220C. It user 231 is authenticated in the computing system 210, he can access cloud services 220A, 220B, and 220C without having to be challenged for authentication again.

FIG. 2B shows an enterprise's computing system 210 (hereinafter, "enterprise's computing system" is also referred to as "enterprise") and a cloud service 220 (e.g., the cloud 220A, 220B, or 220C). As indicated by bidirectional arrow 240, enterprise 210 and cloud service 220 have pre-established trust relationship there between.

To set the identity federation at both sides of enterprise 210 and cloud service 220, enterprise's system administrator 230 needs to interact with different user interfaces.

On the one hand, system administrator 230 has to interact with the user interface 213 at the enterprise side to configure or set the identity federation for the side of enterprise 210. The process of configuring identity federation is to set values of properties of the identity federation configuration. The identity federation configuration properties, after being set, will be provided to an identity federation runtime component 218 at the side of computing system 210. Examples of identity federation configuration properties include "SSO_endpoint" (single sign on endpoint), "private_key" (private key), "Issuer" (the issuer) and for example. In practical applications, such identity federation configuration properties (hereinafter also referred to as "federation configuration properties," "configuration properties" or "properties") are often large in amount. In creating identity federations and re-configuring identity federations, the system administrator 230 needs to set corresponding values for a large number of properties.

On the other hand, system administrator 230 has to interact with user interface 223 of the cloud service to set the identity federation for the cloud, i.e., set corresponding values for the federation configuration properties at the cloud service side. The federation configuration properties, after being set, will be provided to an identity federation runtime component 228 at the side of cloud service 220. Similarly, there are also a large number of federation configuration properties at the cloud side.

In general, a cloud services provider can offer cloud services in a proprietary environment. Also, proprietary data formats are used in the user interface 223. Since the identity federation configuration at the side of enterprise 210 and the identity federation configuration at the side of cloud service 220 can adopt different standards, the styles, as well as the data formats, of user interface 213 and user interface 223 can be completely different. System administrator 230 needs to be familiar with not only the identity federation configuration standards and the user interface at the enterprise side, but also the identity federation configuration standards and the user interface at the cloud service side. If an enterprise needs to be connected to different cloud services, the system administrator shall need to set identity federation configuration properties via user interfaces provided by different cloud services, and thus need to be familiar with proprietary data formats of the different cloud services.

In addition, for the identity federation configuration properties at the side of enterprise 210 and the identity federation configuration properties at the side of cloud service 220, some of their contents are interrelated, or even the same. System administrator 230 has to repeatedly, via different user interfaces, set the value of such content-related or even same properties, which not only unnecessarily increase the workload of the system administrator but also increase the possibility of error.

Therefore, the basic idea of the present invention is to set identity federation configurations for two such computing systems in a centralized and uniform way, so as to improve the efficiency of the system administrator and decrease the probability of error.

Figure 3A:
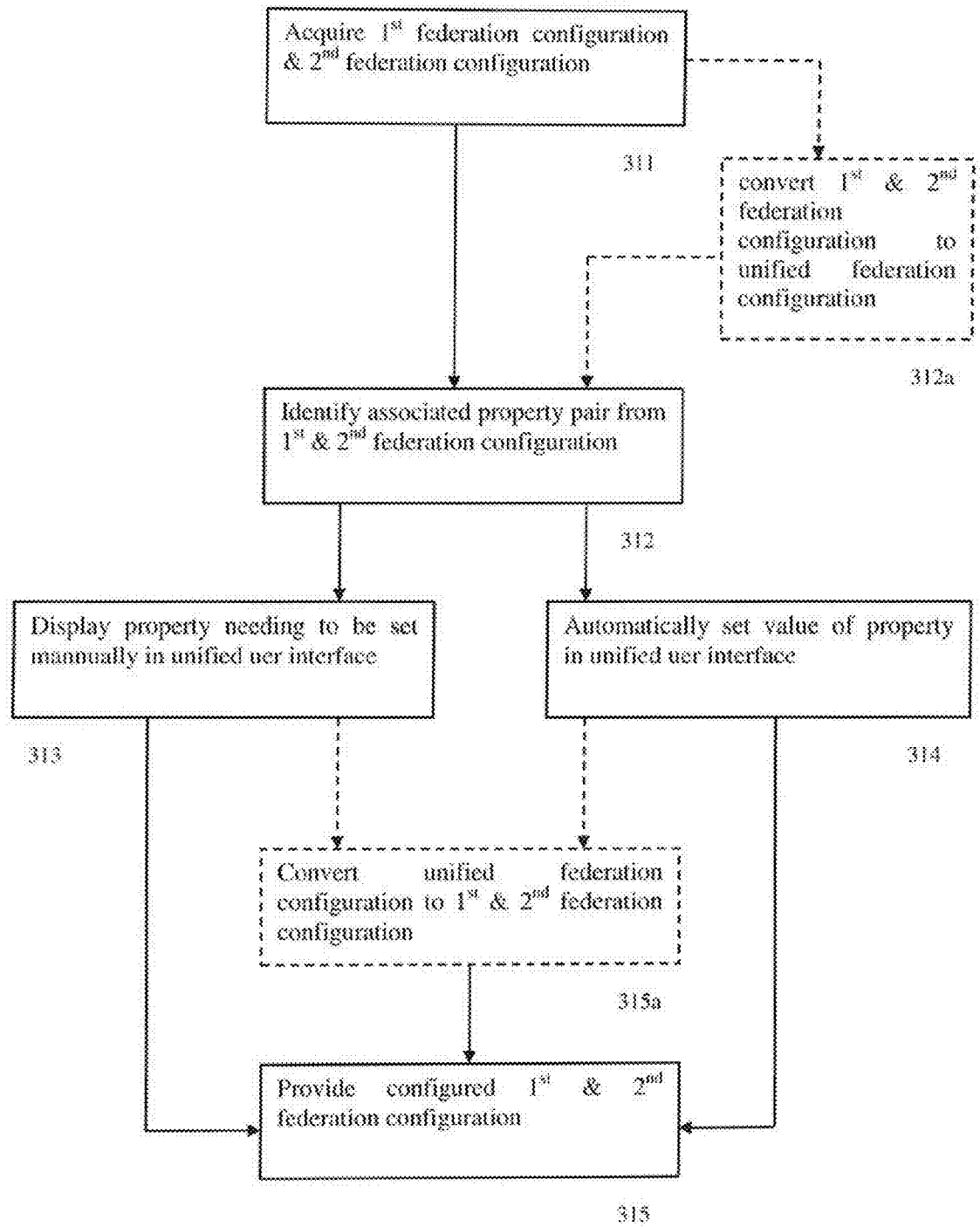
FIG. 3A is a flowchart showing of a method of configuring identity federation configurations according to an embodiment of the present invention.
Figure 3B:
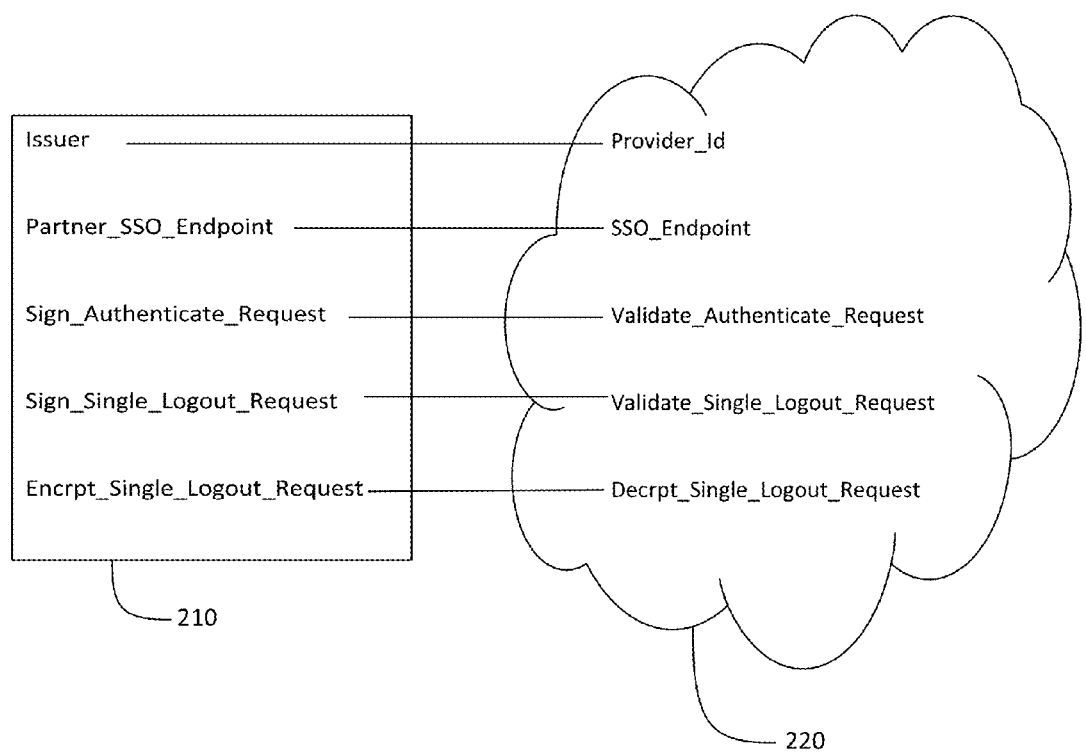
FIG. 3B is an abstraction model illustrating of an example identity federation configurations of two different computing systems according to an embodiment of the present invention.

With reference to FIGS. 3A and 3B, various embodiments of the present invention will be described in detail below. Refer first to FIG. 3A, which shows the flowchart of a method according to one aspect of the present invention.

Broadly speaking, it is shown in FIG. 3A a method for configuring identity federation configuration, including: acquiring a first set of identity federation configuration properties of a first computing system and a second set of identity federation configuration properties of a second computing system; identifying one or more pairs of associated properties in the first and the second sets of identity federation configuration properties, where each of the pairs of associated properties includes one property from the first set of identity federation configuration properties and one property from the second set of identity federation configuration properties; displaying, in a unified user interface, properties that need to be configured manually from the first and the second sets of identity federation configuration properties, where the properties that need to be configured manually do not include the property in any pair of associated properties for which the value can be derived from the value of another property in the pair; automatically assigning a value to an property for which the value can be derived from the value of another property; and providing the first and the second computing systems respectively with the first set of identity federation properties and the second set of identity federation properties that have been configured.

Referring now to the drawings, the operation of each of the steps is described in detail. In the following description, an enterprise subscribing a cloud service and the cloud service are respectively taken as the example of the first computing system and the second computing system. However, by taking the enterprise and the cloud service as examples, it is only to provide references for description so as to facilitate a better understanding of various aspects of the present invention. Those skilled in the art, upon reading the specification, shall readily appreciate that the first computing system and the second computing system of the invention are not limited to the enterprise and the cloud service.

The process of the method according to an aspect of the present invention starts with Step 311.

In Step 311, a first set of identity federation configuration properties of a first computing system and a second set of identity federation configuration properties of a second computing system are acquired.

For example, the first computing system is enterprise 210 shown in FIG. 2B. The identity federation configuration (hereinafter also referred to as "federation configuration") of the enterprise is a set of pairs of <property, value of property> which can also be characterized as a set of federation configuration properties FC1 consisting of all properties in the <property, value of property> pairs:

$$FC1 = \{para1\_1, para1\_2, \ldots para1\_m\} \quad (1)$$

wherein "para1_$i$" ($i=1 \ldots m$) denotes a property of the set FC1.

Generally speaking, when a federation configuration is initially created, the properties of the set FC1 can all need to be assigned with values by the system administrator. However, at the time of resetting (e.g., modifying) the federation configuration, some of the properties can have predetermined values already, that is to say, there is no need for the system administrator to re-enter the values.

Similarly, the federation configuration of the cloud service is a set of pairs of <property, value of property> which can be characterized as a set of federation configuration properties FC2 consisting of all properties in the <property, value of property> pairs:

$$FC2 = \{para2\_1, para2\_2, \ldots para2\_n\} \quad (2)$$

wherein "para2_$i$" ($i=1 \ldots n$) denotes a property of the set FC2.

Similar to the description on the set FC1 in the above, some of the properties in the set FC2 have predetermined values.

During the process of federation single sign-on, enterprise 210 and cloud service 220 needs to conduct message interaction. The interactive message needs to be signed and verified in order to ensure the integrity and consistency of the message. The enterprise need the "signature key" (private key for signing) to sign on the message to be sent to the cloud service from the enterprise. The cloud service needs the "validation key" (public key paring with the private key) for verifying the message sent over from the enterprise. The properties in the set FC1 include, for example, the "signature key" needed by the enterprise and the properties in the set FC2 include, for example, the "validation key" needed by the cloud service.

In Step 312, one or more pairs of associated properties in the first and the second sets of identity federation configuration properties are identified, where each of the pairs of associated properties includes one property from the first set of identity federation configuration properties and one property from the second set of identity federation configuration properties.

For example, by analyzing the relationship between the properties in the federation configuration property set FC1 of the enterprise and the property in the federation configuration property set FC2 of the cloud service, if there is association relationship between a property para1_$j$ from the property set FC1 and a property para2_$k$ from the property set FC2, then it is identified that the property para1_$j$ and the property para2_$k$ are a pair of associated properties denoted as <para1_$j$, para2_$k$>. The association relationship between the property para1_$j$ and the property para2_$k$ is expressed by a correlation function $F(1\_j, 2\_k)$. Such a pair of associated properties and its corresponding correlation function can be denoted as:

$$(<para1\_j, para2\_k>, F(1\_j, 2\_k)) \quad (3)$$

For example, if the relationship defined by the correlation function $F(1\_j, 2\_k)$ is "equal to", it means that the value of the property para1_$j$ in the pair of associated properties should be equivalent to the value of the property para2_$k$.

An enterprise and a cloud service can belong to different domains, but the domains to which the enterprise and the cloud service belong all have built-in identity federation domain knowledge. With the identity federation domain knowledge, the role and the meaning of the federation configuration property from different domains can be analyzed so as to identify whether there is existed any association relationship between a federation configuration property from one domain (e.g., the enterprise) and a federation configuration property from another domain (e.g., the cloud service). In practical applications, those skilled in the art can define the rules for associating the identity federation domain knowledge of the enterprise side with the identity federation domain knowledge of the cloud side, and then store the association rules in a computer readable association rule repository. As a result, the computer can automatically determine association relationship between the properties in the set FC1 and the properties of the set FC2 based on the rules in the association rule repository, for example, that there is association relationship between the "signature key" needed by the enterprise and the "validation key" needed by the cloud service, as described above.

In accordance with an embodiment of the invention, an optional Step 312a can be taken, prior to Step 312, to convert the first set of federation configuration properties and the second set of federation configuration properties as acquired in Step 311, respectively, to a first set of public federation configuration properties and a second set of public federation configuration properties. The step is represented with dashed box and dashed arrows in FIG. 3A.

The term "public federation configuration property" is also referred to as "unified federation configuration property" or "unified federation configuration." In accordance with an embodiment of the invention, the properties in the first set of public federation configuration properties and the second set of public federation configuration properties include configurable properties that are defined according to identity federation domain knowledge and a federation protocol. The set of such configurable properties is also referred to as "identity federation metadata."

In accordance with an aspect of the present invention, the federation protocol an be SAML protocol. Accordingly, the configurable properties defined according to identity federation domain knowledge and the SAML protocol are platform independent. Examples of such configurable properties include Issuer, Signature_Key, Encryption_Key, SSO_Endpoint, SLO_Endpoint, Provider_ID, Partner_ID, Partner_SSO_Endpoint, Partner_SLO_Endpoint, etc.

Similar to the expression of the federation configuration property set FC1, the first set of public federation configuration properties, CFC1, can be expressed as:

$$CFC1=\{Cpara1\_1, Cpara1\_2, \ldots Cpara1\_m\} \quad (1')$$

wherein "Cpara1_$i$" (i=1 ... m) is a property of the public federation configuration property set CFC1, as well as a configurable property in the identity federation metadata.

Similarly, the second set of public federation configuration properties, CFC2, can be expressed as:

$$CFC2=\{Cpara2\_1, Cpara2\_2, \ldots Cpara2\_m\} \quad (2')$$

where "Cpara2_$i$" (i=1 ... m) is a property of the public federation configuration property set CFC2 as well as a configurable property in the identity federation metadata.

According to an aspect of the present invention, Step 312 can be taken, based on Step 312a, to identify one or more pairs of associated properties in the first set of public identity federation configuration properties CFC1 and the second set of public identity federation configuration properties CFC2, where each of the pairs of associated properties includes one property from the first set of public identity federation configuration properties CFC1 and one property from the second set of public identity federation configuration properties CFC2.

For example, based on the relationship between the property in the enterprise's public federation configuration property set CFC1 and the property in the cloud service's public federation configuration property set CFC2, if there is association relationship between a public federation configuration property Cpara1_$j$ of the enterprise and a public federation configuration Cpara2_$k$ of the cloud service, then the property Cpara1_$j$ and the property Cpara2_$k$ are identified to be a pair of associated properties, denoted as <Cpara1_$j$, Cpara2_$k$>. The association relationship between the property Cpara1_$j$ and the property Cpara2_$k$ is expressed with a corresponding correlation function F(1_$j$, 2_$k$). Such a pair of associated property Cpara1_$j$ and property Cpara2_$k$ and its corresponding correlation function may be denoted as:

$$(<Cpara1\_j, Cpara2\_k>, F(1\_j, 2\_k)) \quad (3')$$

Converting federation configuration properties from different domains into a unified format in Step 312a is conducive to the analysis of the converted federation configuration properties in Step 312 to better identify associated property pairs.

FIG. 3B illustratively shows some of the identity configuration properties from two different computing systems. As shown in FIG. 3B, the set of identity configuration properties of the first computing system 210 includes properties "Issuer", "Partner_SSO_Endpoint," "Sign_Authentivate_Request," "Sign_Single_Logout_Request" "Encrpt_Single_Logout_Request," for example. The set of identity configuration properties of the second computing system 220 includes properties "Provider_Id," "SSO_Endpoint" "Validate_Authentivate_Request," "Validate_Single_Logout_Request." "Decrpt_Single_Logout_Request," for example. A line segment connecting two properties in FIG. 3B denotes the association relationship between the two properties identified after Step 312 is performed. For example, there is an association relationship between the property "Issuer and the property" "Provider_Id."

In the single sign-on process for the SAML specification based identity federation, the enterprise needs to send out a "certification request message" to the cloud service and the message is required to include the message issuer. So, it is necessary to configure a property "Issuer" in the enterprise. In addition, the cloud service needs to verify whether the message issuer is the same as the property configured by the system administrator in the cloud service, i.e., the property "Provider ID." Thus, according to the identity federation domain knowledge, it is identified, in Step 312, that the property "Issuer" and the property "Provider ID" have association relationship and the association relationship is of equal relationship. The association relationship of the properties "Issuer" and "Provider ID" can be expressed by the expression (3) as described above:

{<Issuer, Provider_Id>, F1} wherein the correlation function F1 denotes that the value of the "Issuer" is equal to the value of the "Provider_Id."

In the single sign-on process for the SAML specification based identity federation, the enterprise needs a configuration property "Partner_SSO_Endpoint" (single signing-on endpoint of the cloud service) and the cloud service has provided a configuration property "SSO_Endpoint" (single signing-on endpoint). For example, for the cloud service "SampleCloudService", the value of the property is "https://login SampleCloudService.com." Based on the identity federation domain knowledge, it is identified in Step 312 that the property "Partner_SSO_Endpoint" and the property "SSO_Endpoint" have association relationship, that is:

{<Partner_SSO_Endpoint, SSO_Endpoint>, F2} wherein the correlation function F2 denotes that the value of the "Partner_SSO_Endpoint" is equal to the value of the "SSO_Endpoint."

Apparently, if the property SSO_Endpoint already has a value, then, at the time of setting the configuration property "Partner_SSO_Endpoint" of the enterprise, the value of the property SSO_Endpoint can be directly assigned to the property "Partner_SSO_Endpoint," without having to expose the configuration property to the system administrator.

The relationship between the single log-out endpoint of the cloud service that the enterprise needs to configure and the single log-out endpoint (not shown) that the cloud service needs to configure is similar to the relationship between the property "Partner_SSO_Endpoint" that the enterprise needs to configure and the configuration property "SSO_Endpoint" of the cloud service as described above.

In the single sign-on process for the SAML specification based identity federation, in order to ensure consistency of the "authentication request message," the enterprise needs to sign on the message. So it is necessary to configure the property "Sign Authentication Request." The cloud service declares whether the authentication request message shall be authenticated by configuring the property "Validate Authentication Request." Based on this kind of knowledge, it can be recognized that there is association relationship between these two properties, namely:

{<Sign_Authentication_Request, Validate_Authentication_Request>, F3} wherein the correlation function F3 denotes that the values of the two properties are equal.

Similarly, there is also association relationship between the configuration property "Encrypt Authentication Request" (not shown) that is used by the enterprise for encrypting the "authentication request message" and the configuration property. "Decrypt Authentication Request" (not shown) that is used by the cloud service for decrypting the "authentication request message," and the association relationship is of equal relationship.

For the single log-out message, there is also association relationship between the configuration properties "Sign_Single_Logout_Request" and "Validate_Single_Logout_Request," and the association relationship is of equal relationship.

There is also association relationship between the properties "Encrypt_Single_Logout_Request" and "Decrypt_Single_Logout_Request," and the association relationship is of equal relationship.

In Step 313, properties that need to be configured manually from the first and the second sets of identity federation configuration properties are displayed in a unified user interface, where the properties that need to be configured manually do not include the property in any pair of associated properties for which the value can be derived from the value of another property in the pair. In other words, if the value of one of the properties from any identified pair of associated properties can be derived from the value of another property, then the properties that need to be set manually do not include the one of the properties.

System administrator 230 can enter the value of the property that needs to be set manually via the unified user interface. In this way, the first set of identity federation configuration properties and the second set of federation configuration properties that have been configured can be acquired. In other words, in Step 313, the first identity federation configuration properties and the second federation configuration properties that need to be set by the system administrator are all displayed in a unified user interface rather than respectively displayed in different user interfaces.

In addition, the properties displayed do not include those ones of which the values can be assigned automatically, for example, a property of which the value can be derived from the value of another property.

Based on the relationship between two properties within an associated property pair, as well as whether some property of the two properties has a predetermined value, it can be determined whether the value of one of the properties can be derived from the value of the other property.

As shown in the expression (3) in the above, the associated property pair <para1_j, para2_k> corresponded correlation function F (1_j 2_k) is used to define the association relationship between the property para1_j and the property para2_k. Thus, based on the association relationship between the property para1_j and the property para2_k in the associated property pair <para1_j, para2_k>, it can be determined whether the value of one property para1_j can be derived from the value of another property para2_k, or whether the value of the property para2_k can be derived from the value of the other property para1_j. One common relationship between the property para1_j and the property para2_k is "equal" relationship. In that case, the value of the property para2_k can be derived from the value of the property para1_j, and vice versa.

Take the property "Partner_SSO_Endpoint" and the property "SSO_Endpoint" shown in FIG. 3B as an example. According to the identity federation domain knowledge, it can be identified, in Step 312, that they have association relationship, i.e., {<Partner_SSO_Endpoint, SSO_Endpoint>, F}. The relationship defined by the correlation function F is "Partner_SSO_Endpoint" is equal to "SSO_Endpoint" (i.e., the value of "SSO_Endpoint" may be assigned to "Partner_SSO_Endpoint") or "SSO_Endpoint" is equal to "Partner_SSO_Endpoint" (i.e., the value of "Partner_SSO_Endpoint" can be assigned to "SSO_Endpoint."

If the property "SSO_Endpoint" has a predetermined value of "https://login.SampleCloudService.com," in accordance with the definition of the correlation function F, namely, "Partner_SSO_Endpoint" is equal to "SSO_Endpoint," the value "https://login.SampleCloudService.com" may be assigned to the property "Partner_SSO_Endpoint." In this case, the property "Partner_SSO_Endpoint" is of self-configurable federation configuration property, and does not need to be manually set by the system administrator.

As another example, the properties "Issuer" and "Partener_Id," shown in FIG. 3B, also have a similar association relationship. In a SAML federation, the provider of identity as one party (such as the enterprise 210) shall bring forward an "Issuer" property, and the partner as the other party (such as cloud service 220) is required to have a "Partner_Id" property. The two properties must have the same value; otherwise, the token issued from one party to another can not pass verification. Thus, a pair of association properties shall be determined in Step 312, which includes the property "Issuer" from enterprise 210 and the property "Partener_Id" from cloud 220, and in the correlation function the relationship of the "Issuer" and the "Partener_Id" shall be: "Partener_Id" is equal to "Issuer" or "Issuer" is equal to "Partener_Id." Thus, in Step 313, is the property "Issuer" has a predetermined value, then the property "Partener_Id" belongs to self-configurable federation configuration properties, and does not need to be manually set by the system administrator.

In addition to the simple "equal" relationship, in specific applications, there might be other complicated relationships between the properties in an associated property pair <para1_j, para2_k>. Those skill in the art can base specific applications to design corresponding rules in the association rule repository so as to enable the computer to automatically identify the other relationships and, for each pair of associated properties, determine whether the value of one of its properties can be derived from the value of the other property and thus determine whether the one property is of the properties that need to be manually set.

In Step 314, a value is automatically assigned to a property for which the value can be derived from the value of another property. In other words, the value of a property of an associated property pair is automatically set based on the association relationship between the properties in the associated property pair.

Still take the associated property pair <Partner_SSO_Endpoint, SSO_Endpoint> shown in FIG. 3B for example. As described in the above, the property "Partner_SSO_Endpoint" and the property "SSO_Endpoint" have association relationship, namely, {<Partner_SSO_Endpoint, SSO_Endpoint>, F}, wherein the relationship is defined by the correlation function F to be: "Partner_SSO_Endpoint" is equal to "SSO_Endpoint." If the property "SSO_Endpoint" has a predetermined value "https://login.SampleCloudService.com," then the property "Partner_SSO_Endpoint" belongs to self-configurable federation configuration properties, and does not need to be manually set by the system administrator.

In that case, in Step 314, based on the association relationship between the property "Partner_SSO_Endpoint" and the property "SSO_Endpoint" in the associated property pair <Partner_SSO_Endpoint, SSO_Endpoint>, i.e., "Partner_SSO_Endpoint" is equal to "SSO_Endpoint," the value of the property "SSO_Endpoint," or "https://login.SampleCloudService.com," is assigned to the property "Partner_SSO_Endpoint."

In the above example, when automatically assigning value to the property "SSO_Endpoint" for which the value can be derived from the value of another property "Partner_SSO_Endpoint," said value of another property, "https://login.SampleCloudService.com," is a predetermined value.

According to an aspect of the present invention, the value of another property can be a value that is input from a unified user interface. For example, in the above example, the value of the property "Partner_SSO_Endpoint," "https://login.SampleCloudService.com," can also be entered by the system administrator via a unified user interface.

After Steps 313 and 314, both the property displayed on the unified user interface that need to be manually set and the property for which the value can be derived from the value of another property are either manually set or automatically set. Then, the process proceeds to Step 315.

In the Step 315, first computing system 210 and second computing system 220 are respectively provided with the first set of identity federation properties and the second set of identity federation properties that have been configured. For example, the first set of federation configuration properties CF1 and the second set of identity federation configuration properties CF2 that have been configured can be directly provided to identity federation runtime 218 at the enterprise side and identity federation runtime 228 at the cloud side.

As described in the above, prior to Step 312, an optional Step 312a can be taken to convert the first set of federation configuration properties and the second set of federation configuration properties as acquired in Step 311, respectively, to a first set of public federation configuration properties and a second set of public federation configuration properties. Accordingly, the first set of federation configuration properties and the second set of federation configuration properties, in the operation of Step 312 to 314, are respectively rendered in the format of the first set of public federation configuration properties and the second set of public federation configuration properties.

In accordance to an aspect of the present invention, in the case that Step 312a is taken, Step 315 can include Step 315a in which the first set of public identity federation configuration properties CFC1 and the second set of public identity federation configuration properties CFC2 are converted, respectively, to the first set of identity federation configuration properties FC1 and the second set of public identity federation configuration properties FC2. In this way, the formats of the federation configurations respectively received by first computing system 210 and second computing system 220 are resumed to their previous formats that can be readily used.

Conversion of the first and the second sets of public identity federation configuration properties (FC1, CFC2) respectively to the first and the second sets of identity federation configuration properties (FC1, FC2) is the inverse operation of conversion of the first and the second sets of identity federation configuration properties (FC1, FC2) respectively to the first and the second sets of public identity federation configuration properties (CFC1, CFC2), thus unnecessary redundant description is omitted here.

According to an aspect of the present invention, the first set of identity federation properties and the second set of identity federation properties that have been configured can be stored, e.g., in a configuration database. Thus, when it is needed to re-set the federation configuration, the first identity federation configuration property set and the second identity federation configuration property set can be obtained directly from the configuration database.

From the above description it can be appreciated that, by employing the method according to various aspects of the present invention, the system administrator is not required to set identity federation properties in different user interfaces and, through the automatic assignment of values to the properties, the number of properties that need to be manually set by the system administrator is reduced.

Various aspects of the method for configuring identity federation configuration of the invention are described in the above. According to the same inventive concept, the invention also provides an apparatus for configuring identity federation configuration.

Figure 4:
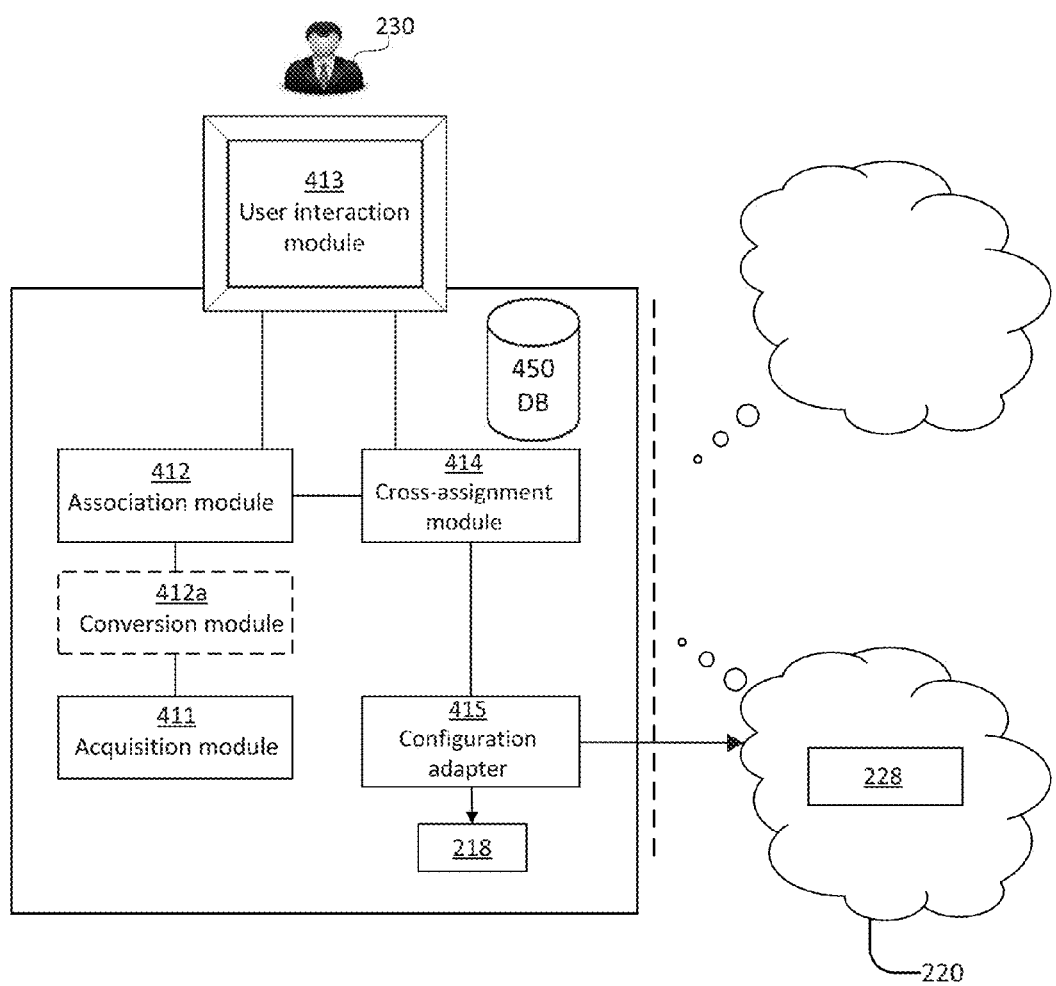
FIG. 4 is an abstraction model illustrating an apparatus according to an embodiment of the present invention.

FIG. 4 shows the block diagram of an apparatus for configuring identity federation according to an embodiment of the invention. The apparatus as shown in FIG. 4 includes an acquisition module 411, an association module 412, a user interaction module 413, a cross-assignment module 414, and a configuration adapter 415.

Acquisition module 411 is configured to obtain a first set of identity federation configuration properties of a first computing system 210 and a second set of identity federation configuration properties of a second computing system 220.

Association module 412 is configured to identify one or more pairs of associated properties in the first and the second sets of identity federation configuration properties, where each of the pairs of associated properties includes one property from the first set of identity federation configuration properties and one property from the second set of identity federation configuration properties.

User interaction module 413 is configured to display, in a unified user interface, properties that need to be configured manually from the first and the second sets of identity federation configuration properties, where the properties that need to be configured manually do not include the property in any pair of associated properties for which the value can be derived from the value of another property in the pair.

In other words, if the value of one of the properties from any identified pair of associated properties can be derived from the value of another property, then the properties that need to be set manually do not include the one of the properties.

Cross-assignment module 414 is configured to automatically assigning a value to a property for which the value can be derived from the value of another property. In other words, cross-assignment module 414 can automatically set the value of a property in an associated property pair according to the association relationship of the properties in the associated property pair.

Configuration adapter 415 is configured to provide first computing system 210 and second computing system 220 respectively with the first set of identity federation properties and the second set of identity federation properties that have been configured.

For example, the first set of federation configuration properties (CF1, CFC1) and the second set of identity federation configuration properties (CF2, CFC2) that have been configured can be directly provided to the identity federation runtime 218 at the enterprise side and the identity federation runtime 228 at the cloud side.

According to an aspect of the present invention, the apparatus for configuring identity federation configuration further includes a conversion module 412a, which is configured to convert the acquired first and second sets of federation configuration properties respectively to a first set of public federation configuration properties and a second set of public federation configuration properties.

According to an aspect of the present invention, the properties in the first set of public federation configuration properties and the second set of public federation properties include configurable properties defined according to the identity federation domain knowledge and a federation protocol.

According to an aspect of the present invention, the federation protocol is SAML protocol.

Accordance to one aspect of the present invention, association module 412 is further configured to identify one or more pairs of associated properties in the first set of public identity federation configuration properties and the second set of public identity federation configuration properties, where each of the pairs of associated properties includes one property from the first set of public identity federation configuration properties and one property from the second set of public identity federation configuration properties.

According to an aspect of the present invention, conversion module 412 is further configured to convert the first set of public identity federation configuration properties CFC1 and the second set of public identity federation configuration properties CFC2 respectively to the first set of identity federation configuration properties FC1 and the second set of identity federation configuration properties FC2.

According to an aspect of the preset invention, the first computing system is an enterprise that orders a cloud service, and the second computing system is the cloud service.

According to an aspect of the present invention, cross-assignment module 414 is configured to set a value of a property in the associated property pair according to a predetermined value. In other words, when cross-assignment module 414 automatically assigns a value to one property for which the value can be derived from the value of another property, said value of another property is a predetermined value.

According to an aspect of the present invention, cross-assignment module 414 is configured to set a value of a property in the associated property pair according to a value that is input via the unified user interface. In other words, when cross-assignment module 414 automatically assigns a value to one property for which the value can be derived from the value of another property, said value of another property is a value that is input via the unified user interface.

According to an aspect of the present invention, the apparatus for configuring identity federation configuration is further configured to store the first set of identity federation properties and the second set of identity federation properties that have been configured in a database, for example, configuration database 450 as shown in FIG. 4.

According to an aspect of the present invention, acquisition module 411 is configured to acquire the first set of identity federation properties and the second set of identity federation properties that have been configured from database 450.

The apparatus for configuring identity federation configuration according to another aspect of the present invention is described above. Since detailed description of embodiments of the method for configuring identity federation configuration of the invention is provided in previous paragraphs, the description of the apparatus in the above is omitted.

It should be noted that the above depiction is only exemplary, not intended for limiting the present invention. In other embodiments of the present invention, this method can have more, or less, or different steps, and numbering the steps is only for making the depiction more concise and much clearer, but not for stringently limiting the sequence between each steps, while the sequence of steps can be different from the depiction.

Therefore, in some aspects of the present invention, the above one or more optional steps may be omitted. Specific embodiment of each step can be different from the depiction. All these variations fall within the spirit and scope of the present invention.

The present invention an adopt a form of hardware embodiment, software embodiment, or an embodiment comprising hardware components and software components. In a preferred embodiment, the present invention is implemented as software, including, without limitation to, firmware, resident software, micro-code, etc.

Moreover, the present invention can be implemented as a computer program product usable from computers or accessible by computer-readable media that provide program code for use by or in connection with a computer or any instruction executing system. For the purpose of description, a computer-usable or computer-readable medium can be any tangible means that can contain, store, communicate, propagate, or transport the program for use by or in connection with an instruction execution system, apparatus, or device.

The medium can be an electric, magnetic, optical, electro-magnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element can include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

It is to be understood from the foregoing description that modifications and alterations can be made to the respective aspects of the present invention without departing from the true spirit of the present invention. The description in the present specification is intended to be illustrative and not limiting. The scope of the present invention is limited by the appended claims only.

The invention claimed is:

1. A method for configuring identity federation configuration, comprising:

acquiring a first set of identity federation configuration properties of a first computing system and a second set of identity federation configuration properties of a second computing system;

automatically identifying one or more pairs of associated properties in the first and the second sets of identity federation configuration properties, wherein:

each of the pairs of associated properties includes one property from the first set of identity federation configuration properties and one property from the second set of identity federation configuration properties; and each of the pairs of associated properties in the first and second sets of identity federation configuration properties are expressed as a correlation function;

displaying, in a unified user interface, properties that need to be configured manually from the first and the second sets of identity federation configuration properties, wherein the properties that need to be configured manually do not include the property in any pair of associated properties for which the value can be derived from the value of another property in the pair;

automatically assigning a value to a property for which the value can be derived from the value of another property and wherein the value depends on the correlation function; and providing the first and the second computing systems with the first configured set of identity federation properties and the second configured set of identity federation properties, respectively.

2. The method according to claim 1, further comprising:
converting the acquired first and second sets of federation configuration properties to a first set of public federation configuration properties and a second set of public federation configuration properties, respectively.

3. The method according to claim 2, wherein the properties in the first set of public federation configuration properties and the second set of public federation properties include configurable properties defined according to the identity federation domain knowledge and a federation protocol.

4. The method according to claim 3, wherein the federation protocol is SAML protocol.

5. The method according to claim 2, wherein said identifying one or more pairs of associated properties in the first and the second sets of identity federation configuration properties comprises:
identifying one or more pairs of associated properties in the first set of public identity federation configuration properties and the second set of public identity federation configuration properties, wherein each of the pairs of associated properties includes one property from the first set of public identity federation configuration properties and one property from the second set of public identity federation configuration properties.

6. The method according to claim 5, wherein providing the first and the second computing systems respectively with the first set of identity federation properties and the second set of identity federation properties that have been configured comprises:
converting the first and the second sets of public identity federation configuration properties respectively to the first and the second configured sets of identity federation properties.

7. The method according to claim 1, wherein the value of an identity federation configuration property is a pre-defined value.

8. The method according to claim 1, wherein the value of an identity federation configuration property is a value that is input via a unified user interface.

9. The method according to claim 5, wherein the first and the second sets of identity federation properties that have been configured are stored in a database.

10. The method according to claim 9, wherein said acquiring a first set of identity federation configuration properties of a first computing system and a second set of identity federation configuration properties of a second computing system comprises:
acquiring the first set of identity federation properties and the second set of identity federation properties that have been configured from the database.

11. An apparatus for configuring identity federation configuration, comprising:

a processor; and
a memory, comprising:
an acquisition module, configured to acquire a first set of identity federation configuration properties of a first computing system and a second set of identity federation configuration properties of a second computing system;
an association module, configured to automatically identify one or more pairs of associated properties in the first and the second sets of identity federation configuration properties, wherein each of the pairs of associated properties includes one property from the first set of identity federation configuration properties and one property from the second set of identity federation configuration properties, and each of the pairs of associated properties in the first and second sets of identity federation configuration properties are expressed as a correlation function;
a user interaction module, configured to display, in a unified user interface, properties that need to be configured manually from the first and the second sets of identity federation configuration properties, wherein the properties that need to be configured manually do not include the property in any pair of associated properties for which the value can be derived from the value of another property in the pair;
a cross-assignment module, configured to automatically assign a value to property for which the value can be derived from the value of another property and wherein the value depends on the correlation function; and
a configuration adapter, configured to provide the first and the second computing systems respectively with the first set of identity federation properties and the second set of identity federation properties that have been configured.

12. The apparatus according to claim 11, further comprising:
a conversion module, configured to convert the acquired first and second sets of federation configuration properties respectively to a first set of public federation configuration properties and a second set of public federation configuration properties.

13. The apparatus according to claim 12, wherein the properties in the first set of public federation configuration properties and the second set of public federation properties include configurable properties defined according to the identity federation domain knowledge and a federation protocol.

14. The apparatus according to claim 13, wherein the federation protocol is SAML protocol.

15. The apparatus according to claim 12, wherein said association module is further configured to identify one or more pairs of associated properties in the first set of public identity federation configuration properties and the second set of public identity federation configuration properties, wherein each of the pairs of associated properties includes one property from the first set of public identity federation configuration properties and one property from the second set of public identity federation configuration properties.

16. The apparatus according to claim 15, wherein said conversion module is further configured to convert the first set of public identity federation configuration properties and the second set of public identity federation configuration properties respectively to the first configured set of identity federation configuration properties and the second configured set of identity federation configuration properties.

17. The apparatus according to claim 11, wherein the value of another property is a pre-defined value.

18. The apparatus according to claim 11, wherein the value of another property is a value that is input via the unified user interface.

19. The apparatus to claim 15, wherein the first and the second sets of identity federation properties that have been configured are stored in a database.

20. The apparatus according to claim 19, wherein said acquisition module is configured to acquire the first set of identity federation properties and the second set of identity federation properties that have been configured from the database.

\* \* \* \* \*